US007984879B2

(12) United States Patent
Cook et al.

(10) Patent No.: US 7,984,879 B2
(45) Date of Patent: Jul. 26, 2011

(54) FLOW CONTROL ACTUATORS

(75) Inventors: Michael Victor Cook, Bedford (GB); Clyde Warsop, Lydney (GB)

(73) Assignee: BAE Systems PLC, London (GB)

( * ) Notice: Subject to any disclaimer, the term of this patent is extended or adjusted under 35 U.S.C. 154(b) by 815 days.

(21) Appl. No.: 11/995,233

(22) PCT Filed: Aug. 31, 2007

(86) PCT No.: PCT/GB2007/003301
§ 371 (c)(1),
(2), (4) Date: Jan. 10, 2008

(87) PCT Pub. No.: WO2008/029095
PCT Pub. Date: Mar. 13, 2008

(65) Prior Publication Data
US 2009/0050734 A1    Feb. 26, 2009

(30) Foreign Application Priority Data

Sep. 6, 2006  (EP) ..................................... 06254643
Sep. 6, 2006  (GB) .................................... 0617428.8

(51) Int. Cl.
*B64C 21/04* (2006.01)
(52) U.S. Cl. ........................................ 244/207; 244/211
(58) Field of Classification Search .................. 244/207, 244/211, 216
See application file for complete search history.

(56) References Cited

U.S. PATENT DOCUMENTS 2,069,047 A   1/1937  Ray
2,568,812 A   9/1951  Lee (Continued)

FOREIGN PATENT DOCUMENTS

BE    483 209    7/1948

(Continued)

OTHER PUBLICATIONS

Notification of Transmittal of the International Search Report and the Written Opinion of the International Search Authority, or the Declaration(Form PCT/ISA/220, 210 and 237) mailed in corresponding International Patent Application No. PCT/GB2007/003301, Dec. 14, 2007; European Patent Office, Rijswijk, Netherland.

(Continued)

*Primary Examiner* — Christopher P Ellis
(74) *Attorney, Agent, or Firm* — Buchanan Ingersoll & Rooney PC

(57) ABSTRACT

A flow control actuator 10 for a body exposed to fluid flow comprises first and second flow surfaces 14, 16 spaced to define an elongate gap 20 therebetween. An elongate control element is disposed in or adjacent the gap and has an externally facing arcuate surface and defines a first slot 24 between the control element and said first flow surface and a second slot between said control element and said second flow surface 26. The control element 22 is moveable to allow the width of said slots to be adjusted generally proportionally. The flow of pressurized flow control fluid passes from a plenum chamber 30 out through one or both slots 24, 26 to be deflected around the arcuate surface under the influence of the Coanda effect. The flow control actuator 10 may be provided in the trailing or leading edge of an aerofoil; alternatively it may be provided between two surfaces spaced to provide said gap but otherwise providing a generally continuous surface.

9 Claims, 3 Drawing Sheets

U.S. PATENT DOCUMENTS

| | | | |
|---|---|---|---|
| 2,885,160 A | | 5/1959 | Griswold, II |
| 3,062,483 A | * | 11/1962 | Davidson ............... 244/207 |
| 3,670,994 A | * | 6/1972 | Kizilos ............... 244/207 |
| 3,873,233 A | | 3/1975 | Linck |
| 4,131,390 A | * | 12/1978 | Schmidt ............... 416/20 R |
| 4,398,687 A | * | 8/1983 | Nichols et al. ............... 244/207 |
| 4,555,079 A | * | 11/1985 | Harvell et al. ............... 244/207 |
| 4,682,746 A | | 7/1987 | Thomas |
| 4,796,265 A | | 1/1989 | Asada et al. |
| 5,485,975 A | * | 1/1996 | Tindell ............... 244/53 B |
| 5,863,090 A | * | 1/1999 | Englar ............... 296/180.1 |
| 6,142,425 A | * | 11/2000 | Armanios et al. ............... 244/207 |
| 7,290,738 B1 | * | 11/2007 | Rogers et al. ............... 244/207 |
| 2001/0046242 A1 | | 11/2001 | Kawakami et al. |
| 2003/0035451 A1 | | 2/2003 | Ishida et al. |

FOREIGN PATENT DOCUMENTS

| | | |
|---|---|---|
| EP | 0 710 005 (B1) | 5/1996 |
| GB | 869065 (A) | 5/1961 |
| GB | 1 251 063 | 10/1971 |
| GB | 2 292 125 (A) | 2/1996 |
| GB | 2 342 079 (A) | 4/2000 |

OTHER PUBLICATIONS

Form PCT/ISA/210 (International Search Report) dated Jun. 5, 2007.
European Search Report dated Mar. 22, 2007.
United Kingdom Search Report dated Dec. 19, 2006.

* cited by examiner

FLOW CONTROL ACTUATORS

FIELD

This invention relates to flow control actuators and particularly, but not exclusively to such actuators for bodies exposed to fluid flow. The invention is therefore concerned with actuators for fixed and moving wing aircraft and hybrid arrangements thereof, as well as submarine craft including ships, submersible vehicles and towed devices. The invention also extends to apparatus for the directional control of pressurised fluid.

BACKGROUND

It has been known for many years that a circulation control actuator may be used to effect modulation of the flow around an aircraft wing to effect aerodynamic control of the vehicle in flight, as an alternative to conventional aerodynamic control using flap surfaces. In a circulation control actuator flow issuing from a narrow slot is caused to be turned around a curved surface by the Coanda effect. This in turn modifies the circulation around the aerofoil giving rise to aerodynamic force and moment changes similar to those caused by flap deflection, but without the drag penalty associated with a flap. The magnitude of the response is governed by the air mass flow through rate through the slot and the operating condition of the aerofoil.

It has also been proposed to provide a trailing edge circulation control actuator in which two parallel spaced slots are provided to either side of an aft facing curved Coanda surface, the flow being supplied to one or other slot by a control arrangement with the flow being angularly deflected one sense when issuing through one slot and in the opposite sense when issuing through the other. A problem with this arrangement is it requires two plenum chambers, one for each slot, which deepens the wing section and twin valve arrangements which introduces complexity in terms of the control to the plenum chambers. The increased depth of the wing due to the plenum chambers produces a problem in that the amount of base drag is significant when there is no flow exiting through either slot. Also the variation in demand for fluid flow through the slots means that the operation of the device supplying the pressurised air may be compromised as in general such devices operate more efficiently where there is a constant bleed of air.

U.S. Pat. No. 4,682,746 describes an arrangement in which an aerofoil section is provided with first and second Coanda effect circulation control ports with a control port selection means designed to direct the flow from a plenum chamber exclusively to one port of the other. In one arrangement there is a wedge-shaped seal means rotatable between a position in which flow through one slot is blocked and a position in which flow through the other slot is locked. The width of both Coanda circulation ports is fixed throughout operation. These and other similar bang-bang control devices have been postulated.

A problem with the bang-bang control proposals is that they do not provide any proportional control and this is far from preferred where the actuator is to be controlled by a flight control system which requires the ability to adjust the flow proportionally for stable control of the vehicle.

SUMMARY

We have therefore identified a need for a flow control actuator which may be accommodated in an aerofoil section of relatively narrow depth and which preferably takes a continuous offtake from source of pressurised fluids such as, for example, bypass flow from a bypass power plant.

For convenience the term 'aerofoil' is used broadly to cover surfaces exposed to air flow as well as surfaces exposed to water flow.

Accordingly, in one aspect, this invention provides a flow control actuator for a body exposed to fluid flow, said control actuator comprising:

a first and a second flow surface each exposed to said fluid flow and spaced to define an elongate gap therebetween;

an elongate control element disposed in or adjacent said gap and having an externally facing arcuate surface, said control element defining a first slot between said control element and said first flow surface and a second slot between said control element and said second flow surface, and being moveably mounted to allow the width of said slots to be adjusted generally proportionally, and delivery means for delivering a flow of pressurised flow control fluid to exhaust through at least one of said first and said second flow slots and to pass over said arcuate surface into said fluid flow.

By this arrangement, the width of each of the slots may be adjusted substantially continuously and inversely so as to provide for a generally proportional control in which the flow through each slot changes smoothly and approximately linearly with movement of the control element.

Although other shaped surfaces may be provided such as elliptical etc, it is preferred for the externally facing arcuate surface to be part-cylindrical. Conveniently, the elongate control element is generally cylindrical. In a preferred arrangement the elongate cylindrical control element is pivotally mounted eccentrically with respect to the first and second flow surfaces. In this manner, the width of each slot changes smoothly and approximately linearly with rotation of the cylinder about its eccentric pivot. Furthermore, since the internally facing portion of the control element is exposed to the entire flow of the flow control fluid, the element may be moved by conventional actuators without requiring substantial force.

The delivery means may typically comprise a plenum chamber disposed behind said gap with means for supplying pressurised flow control fluid to the plenum chamber.

In one arrangement, said first and second flow surfaces comprise respective spaced surfaces or portions thereof of an aerofoil section. Thus, they may comprise the upper and lower surfaces, or port and starboard surfaces of an aerofoil. In this configuration, the slots may be defined at a trailing edge region of the aerofoil; alternatively, they may be defined at a leading edge region of the aerofoil.

In another arrangement, the first and second flow surfaces define respective forward and rearward flow surfaces so that the first and second slots open generally transversely with respect to the fluid flow. In this arrangement, depending on the position of the elongate control element, the pressurised flow control fluid may act to accelerate said fluid flow past said slots or to retard said flow.

Preferably, the actuator includes drive means for moving said control element, said drive means being responsive to a proportional input demand signal to provide proportional control of said control element.

The invention also extends to a flow control actuator module, comprising a flow control actuator as set out above including means for attachment to a wing panel.

The invention also extends to a wing fitted with a flow control actuator as set out above.

The invention further extends to a vehicle fitted with a flow control actuator as set out above.

The principles of proportionally and selectively adjusting the direction of the flow of pressurised fluid may be used in other applications where the body is not necessarily exposed to fluid flow, for example in fluidic control or fluidic logic applications.

In another aspect therefore, this invention provides apparatus for the directional control of a flow of pressurised fluid, which comprises:

first and second surfaces spaced to define an elongate gap therebetween;

an elongate control element disposed in or adjacent said gap and having an externally facing arcuate surface, said control element defining a first slot between said control element and said first surface and a second slot between said control element and said second surface, and being moveably mounted to allow the width of said slots to be adjusted generally proportionally, and delivery means for delivering a flow of pressurised flow control fluid to exhaust through at least one of said first and second flow slots and to pass over said arcuate surface to be deflected thereby in a respective direction.

Whilst the invention has been described above, it extends to any inventive combination or sub-combination of features set out above or elsewhere in this specification.

BRIEF DESCRIPTION OF THE DRAWINGS

The invention may be performed in various ways, and an embodiment thereof will now be described by way of example only, reference being made to the accompanying drawings, in which.

DETAILED DESCRIPTION

Figure 1:
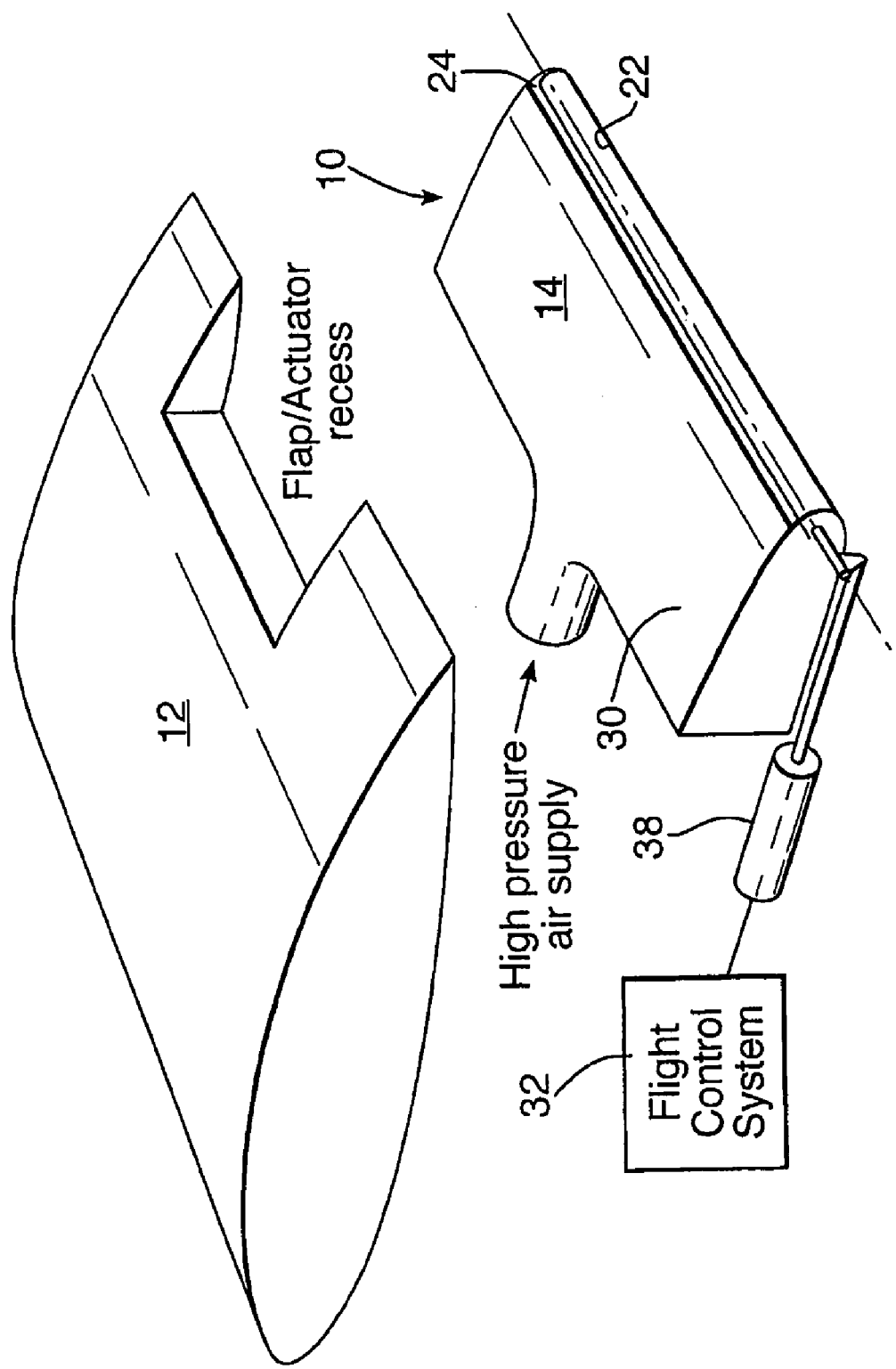
FIG. 1 is an exploded schematic view of wing panel fitted with a flow control actuator in accordance with an embodiment of this invention.
Figure 2:
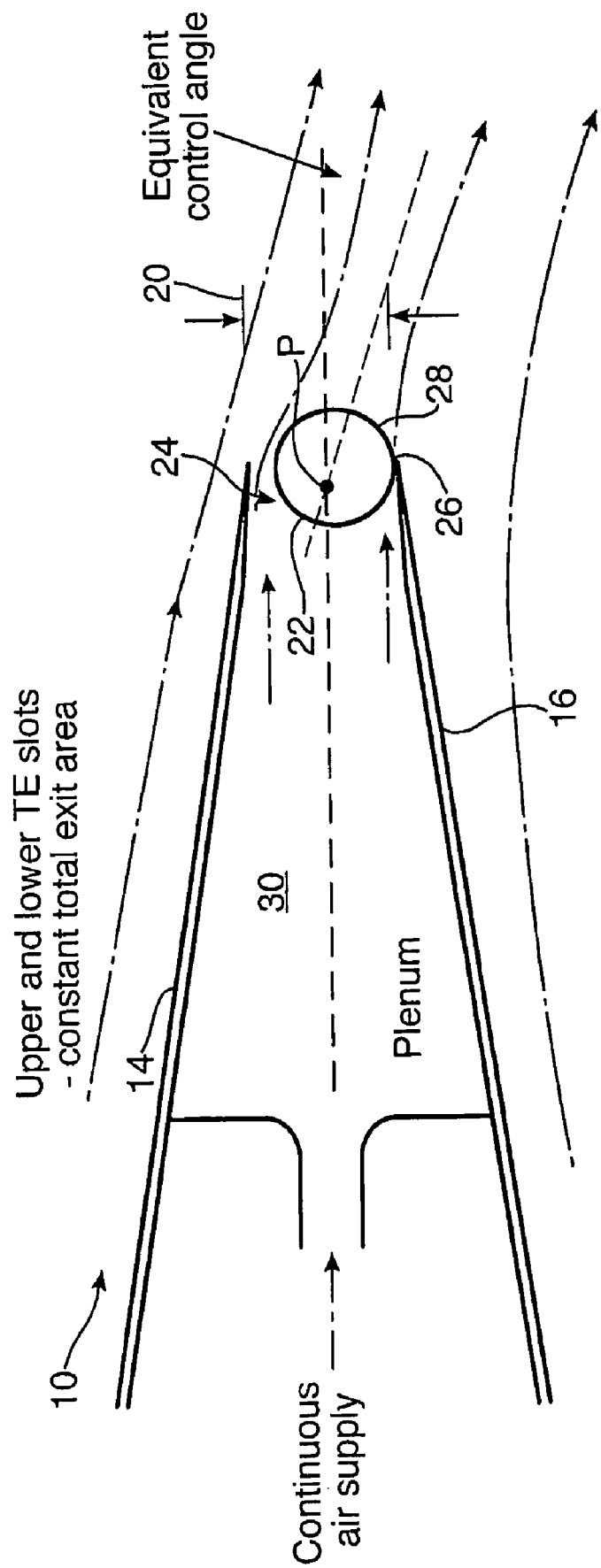
FIG. 2 is a detailed sectional view through the aft end of the flow control actuator in the arrangement FIG. 1.

Referring initially to the arrangement of FIGS. 1 and 2, there is illustrated a flow control actuator 10 for use in a flapless unmanned aircraft (UAV) to provide a continuously modulated bi-directional device for incorporation into a fully autonomous flight control system. In this particular embodiment, the flow control actuator 10 is designed as a wedge-shaped self-contained module for direct replacement of a conventional surface flap in the trailing edge of a wing 12. In another embodiment, the flow control actuator can be placed in a leading edge of a wing 12.

Referring now more particularly to FIG. 2, the flow actuator 10 of this embodiment comprises upper and lower aerofoil surfaces 14, 16 extending rearwardly and terminating to provide a gap 20 of a fixed spacing. Eccentrically mounted for pivoting movement about an axis P within the gap is a cylindrical control element 22 which is disposed between the upper and lower aerofoil surfaces 14, 16 to define, in its equilibrium position, an upper and a lower slot 24, 26 spaced by the cylindrical control element 22 which provides a Coanda surface 28 of cylindrical form. The control element 22 is free to rotate eccentrically about its longitudinal (spanwise) axis P which is offset from its symmetrical axis such that the upper and lower slots 24, 26 can be adjusted from fully open to fully closed in an asymmetric manner. FIG. 2 shows the control element 22 pivoted to its lowest position in which the lower slot 26 is closed and the upper slot 24 is fully open. Thus by rotating the control element 22, the magnitude of the upper and lower slot Coanda effects sum asymmetrically to result in proportional bi-directional modulation of the control force and moment. When in its equilibrium position, the upper and the lower slots 24, 26 are both open and flow through the slots deflected to converge and detach to produce a very narrow wake region so that there is a low base drag. Rotating the control element 22 clockwise as seen in the diagram, increases the width of the upper slot 24 whilst reducing the width of the lower slot 26 and so the mass flow through the upper slot increases to cause a generally downward deflection. Rotation of the control element 22 counter-clockwise produces the opposite effect.

The control element 22 may be angularly adjusted by any suitable mechanism such as servo-actuator 38. The eccentric mounting means that the control force necessary to modulate the widths of the slots is of reasonable magnitude.

Compared to bang-bang arrangements the air mass flow rate through the system is generally constant although there may be slight variations. Since both slots 24, 26 are supplied from the same plenum chamber 30, only the single plenum chamber is required thereby allowing a thinner wing profile. Since all the control air is supplied from the same plenum the control lag is much reduced so a high control bandwidth is achievable. Proportional control of the width of the slots and therefore the equivalent control angle induced by the Coanda effects from both slots provides fully proportional bi-directional operation with high control resolution and so allows control via a simple electrical command signal from e.g. a flight control system 32.

In addition, as shown in FIG. 1, the device can be designed as a simple interchangeable replacement for a flap control on a wing 12.

The illustrated embodiment provides an arrangement for modulating the resultant control force and moment generated by the device without requiring internal airflow throttling. In particular, compared to the proposals in which two flows are separately controlled, the present arrangement has reduced mechanical complexity for enhanced bi-directional control, enhanced control bandwidth, and control linearity. Furthermore the back pressure variations are minimal. The described embodiment provides a device with an actuated trailing edge which is fully capable of proportional bi-directional control.

Whilst in the above embodiment the control element is actuated by means of an external servo-actuator 38, other arrangements are possible, and in particular, the cylindrical control element actuation system may be enclosed within the plenum chamber 30 to make the device self-contained, robust and simple to install.

It will be appreciated that the size and dimension of the various components will be selected having regard to the particular application and whether the vehicle is an aircraft or water vessel. Suitable dimensions for a typical application in an air vehicle are a span of approximately 150 mm and a chord of about 60 mm. To give sufficient control resolution, the angular deflection of the control element 22 is approximately ±20° with the upper and lower trailing edge slots 24, 26 having a maximum opening width of less than 1 mm, with a typical cylinder diameter of approximately 6 mm.

In more general terms, the device described above has been tested and found to work well for arrangements having H/R (=ratio of slot height to radius of Coanda surface) in a range of from 0.0025-0.01. The ratio of Coanda surface radius to chord length typically would lie in the range of from 0.2% to 5% and more particularly somewhere in the region of 0.8%.

It will of course be appreciated that this design of dual slot with continuous modulation may be used at the trailing edge of a wing or aerofoil section.

Figure 3:
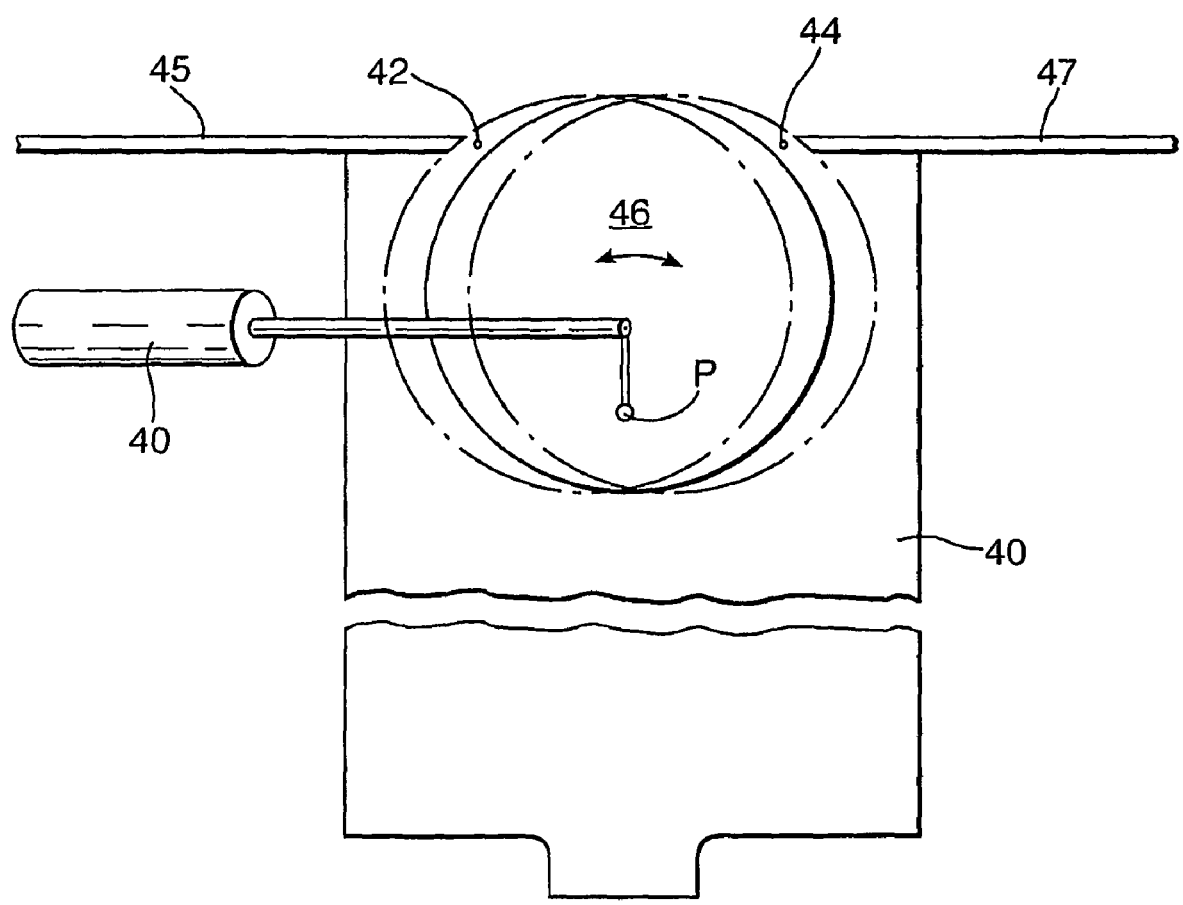
FIG. 3 is a schematic view of another form of flow control actuator in accordance with this invention.

Referring now to the arrangement of FIG. 3, here the flow control actuator provides two parallel spaced continuously and generally inversely variable slots 42, 44 facing generally perpendicularly from a surface defined by a first surface 45 and a second surface 47. A rotatable control cylinder 46 is mounted eccentrically at P and moveable to vary the width of the two slots 42, 44. Air from a plenum chamber 40 exhausts through the slots and depending on the setting of the control cylinder 46 can either produce a Coanda control jet to the left as viewed (when the left hand slot is closed) or to the right (when the right hand slot is closed). When the control cylinder 46 is in its equilibrium position, flow will issue through both slots to pass into the cylinder. The cylinder is controlled by an actuator 48.

The invention claimed is:

1. A flow control actuator for a body exposed to fluid flow, said control actuator comprising:
   a first and a second flow surface each exposed to said fluid flow and spaced to define an elongate gap therebetween;
   an elongate control element disposed in or adjacent said gap and having an externally facing arcuate Coanda surface, said control element defining a first slot between said control element and said first flow surface and a second slot between said control element and said second flow surface, and being moveably mounted to allow a respective width of each slot to be adjusted generally proportionally, and
   delivery means for delivering a flow of pressurized flow control fluid to exhaust through at least one of said first and said second flow slots and to pass over said arcuate Coanda surface into said fluid flow,
   wherein said first and second flow surfaces include respective upper and lower surfaces or portions thereof of an aerofoil section.

2. The flow control actuator according to claim 1, wherein said arcuate Coanda surface is part-cylindrical.

3. The flow control actuator according to claim 1, wherein said elongate control element is generally cylindrical.

4. The flow control actuator according to claim 1, wherein said elongate control element is pivotally mounted with respect to said first and said second flow surfaces.

5. The flow control actuator according to claim 4, wherein the elongate control element is eccentrically mounted.

6. The flow control actuator according to claim 1, wherein said delivery means comprises a plenum chamber disposed behind said gap, and means for supplying pressurised flow control fluid to said plenum chamber.

7. The flow control actuator according to claim 1, wherein said slots are defined at a trailing edge region of said aerofoil.

8. The flow control actuator according to claim 1, wherein said first and second flow surfaces define respective forward and rearward flow surfaces with said first and second slots opening transversely thereto.

9. An apparatus for the directional control of a flow of pressurised fluid, comprising:
   first and second surfaces spaced to define an elongate gap therebetween;
   an elongate control element disposed in or adjacent said gap and having an externally facing arcuate Coanda surface, said control element defining a first slot between said control element and said first surface and a second slot between said control element and said second surface, and being moveably mounted to allow a respective width of each slot to be adjusted proportionally; and
   delivery means for delivering a flow of pressurised flow control fluid to exhaust through at least one of said first and second flow slots and to pass over said arcuate Coanda surface to be deflected thereby in a respective direction,
   wherein said first and second flow surfaces comprise respective upper and lower surfaces or portions thereof of an aerofoil section.

* * * * *